Oct. 29, 1935.   W. B. NORMELLI   2,019,356
REFRIGERATING MACHINE OPERATING WITH A SOLID ABSORBENT
Filed May 13, 1931
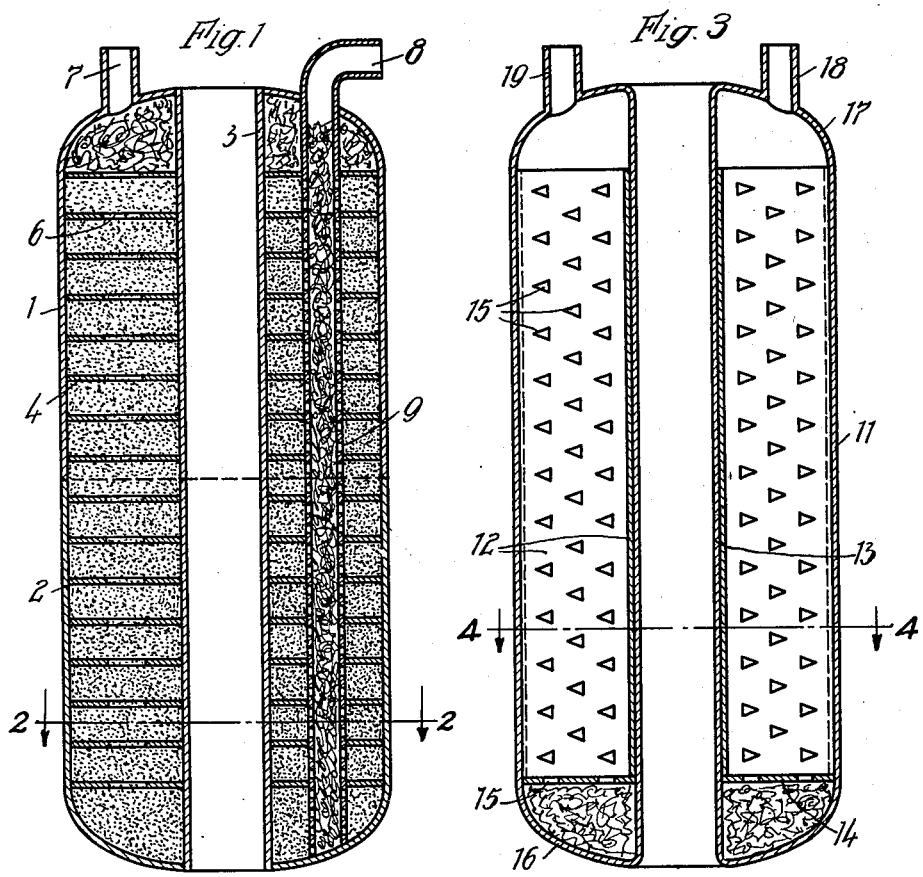
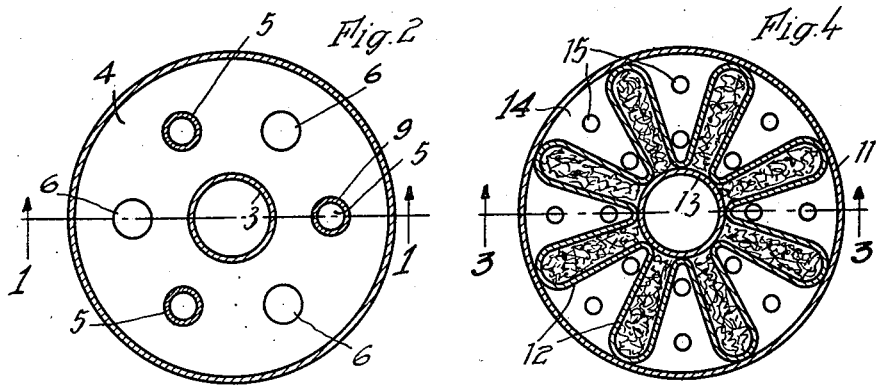
Inventor
Wulff Berzelius Normelli
by Knight Bros
Attorneys Patented Oct. 29, 1935

2,019,356

UNITED STATES PATENT OFFICE 2,019,356

REFRIGERATING MACHINE OPERATING WITH A SOLID ABSORBENT

Wulff Berzelius Normelli, Berlin-Charlottenburg, Germany

Application May 13, 1931, Serial No. 536,996
In Germany May 14, 1930

9 Claims. (Cl. 62—179)

My invention relates to improvements in refrigerating machines operating with a solid absorbent and more particularly to a construction of the boiler-absorber for such refrigerating machines, and to a method of preparing the solid absorbent, to render it suitable for such absorbers.

In an absorption refrigerating machine operating with a solid absorbent, provision must be made for efficiently carrying the heat to and from all parts of the absorbent. For this purpose heat-conducting elements are built in. It is known, e. g. to place layers of absorbent between metal plates or sheets.

My invention relates to a particular construction of such a boiler-absorber and to a method of preparing the absorbent for refrigerating machines operating with a solid absorbent similar, e. g. to those for which I have applied for U. S. patents under Serial No. 245,575 and Serial No. 387,221. According to my invention, the vessel of the boiler-absorber is first finished by building in heat conducting elements, and then closed with exception of an opening for introducing the absorbent. A plurality of openings for filling may be provided. Then the solid absorbent is filled in through the said openings. The method according to the invention has in the first place the advantage that the vessel can be subjected to the pressure test before being filled with the absorbent, and that possible leaks can readily be made tight by welding them over again. With the known methods, the absorbent material is already filled into the boiler-absorber vessel when the latter is ready for the pressure test. If in such cases, in order to repair leaks, welding operations are carried out, there is danger of a decomposition of the absorbent material, owing to th high welding temperatures. Another advantage of the method according to my invention is that it is considerably more suitable for mass production. The filling is more uniform, and if the method of preparing the absorbent, which will be described hereinafter, is properly carried out, a uniform intimate contact is ensured between the absorbent and the heat conducting walls. The accompanying drawing illustrates, by way of example, constructions of boiler-absorbers representing the idea embodied in my invention.

Fig. 1 shows a longitudinal section on line 1—1, Fig. 2, of a boiler-absorber according to my invention.

Fig. 2 is a cross-section through same on line 2—2, Fig. 1,

Fig. 3 shows a longitudinal section on line 3—3, Fig. 4, and Fig. 4 shows a cross-section on line 4—4, Fig. 3, of another constructional form of boiler-absorber.

The boiler-absorber shown in Figs. 1 and 2 is filled with a saturated haloid compound for instance of calcium or lithium or similar salts which form loose voluminous compounds with ammonia or amines. This boiler consists of two parts 1 and 2 welded together in the middle. The welded joint is indicated by a dashed line $a$. Throughout the interior of the entire vessel 1, 2 extends a central pipe 3, on which disks 4 are spaced apart and fixed, such as by pressing or the like. Between disks 4, thus annular spaces are formed, which are connected with one another through two respectively axially alined groups of openings 5 and 6, provided in the disks, so that longitudinal passages are produced, which extend in the direction of the vessel axis. Into the passages 5, tubes 9 are inserted containing numerous small wall perforations for the gas to pass through. These tubes are filled with a porous material, such as steel wool or glass wool, permitting easy passage of the gas, but preventing the salt contained in the boiler absorber from being entrained by the gases when the latter are driven off.

This boiler absorber is made as follows. The two drawn parts 1 and 2 forming the outer wall are heated, and are slipped over the tube 5, the latter being in a cold condition and already provided with the disks 4. The container so formed is then joined together on a circumferential line and made gastight by welding, folding over of edges in a warm condition, rolling or other means. When cooling, the walls of the container contract so that they press tightly against the disks 4, which are so dimensioned that they are slightly larger than the inner diameter of the container when cold. Into tubes 9 the steel wool or similar suitable material such as aforementioned, is now introduced from outside, while through the other passages 6, the whole of the container is filled with ammoniate of calcium or lithium by means of the filling tube 7. Through the heating of the boiler-absorber during the boiling period, the ammoniate is decomposed into ammonia and salt. The liberated vapors flow through the tubes 9 to the connecting tubes 8, from where they are conveyed to the condenser.

In Figs. 3 and 4 another example of a boiler-absorber is illustrated. The vessel consists of an outer tube 11. A strip of sheet metal 12, which extends throughout the whole cylindrical length of vessel 11 is longitudinally bent backward and forward to form deep radial corrugations, as shown in Fig. 4, and is then inserted into the vessel 11, as shown in Figs. 3 and 4. Into the space remaining free in the center, a tube 13 is forced. It is large enough so that it produces a strong outward pressure against the corrugated tube 12 and in turn through the latter against the inner wall of the vessel 11. In this manner a good heat conducting contact is obtained between corrugated tube 12 and tube 13 on one hand, and between tube 12 and the wall of vessel 11 on the other hand. The cells formed between the corrugations of tube 12 and the vessel wall are closed at the bottom by a sheet metal disk 14. This disk, as well as corrugated tube 12 are provided with openings 15 through which the gaseous refrigerant can flow. The openings are advantageously made in such a manner that the pieces of metal are not completely cut out but only in part and are then bent out so as to project in the form of tongues into the spaces outside of tube 12 to be filled with absorbent substance and thereby to assist in conducting the heat. Vessel 11 is closed by the covers 16 and 17, welded to the two cylindrical ends of the vessel and to the ends of the tube 13. The cover 17 has a connecting pipe 18 and a filling opening 19. The space beneath the closing disk 14 is then filled with steel wool. Also the longitudinal inner cells formed within the corrugations of tube 12 are filled with steel wool as shown in Figs. 3 and 4. As soon as the vessel is so far completed, it is subjected to the pressure test, and then made tight at leaky places. When that is done, it can be filled with the absorbent, which occupies the longitudinal cells formed by the outer wall of tube 12 and the vessel wall.

In order to render the use of a solid absorbent most effective in boiler-absorbers of the character described, it should be properly prepared, preferably by a method which I shall now describe.

As an absorbent, for example, calcium chloride or lithium chloride may be used, but other absorbing or chemically acting substances may also be employed. The absorbent, for example, calcium chloride, is first melted. When it has solidified, it is broken into small pieces as much as possible under exclusion of air and moisture, then ground to a more or less fine-grained or granulous powder. Thereupon, it is enriched under pressure, but not completely saturated, with the refrigerating medium, e. g. ammonia. During the enrichment its volume increases considerably. The powder-like and easily-sliding mass thus obtained is now poured into the filling aperture 19. It fills the whole free space in the interior of the vessel, with exception of that already filled with iron wool. It is of assistance in obtaining a uniform distribution of the powdery absorbent if the vessel is jarred or shaken and, if necessary, also continuously rotated, during the filling. When the desired quantity of absorbent has been put in, the space above the corrugated tube 12 is stuffed with steel wool. Under a sufficient pressure, further absorption of as much ammonia is brought about, as is necessary to obtain the desired saturation. During this absorption, the volume of the absorbent increases still more. Through this increase in volume, a considerable pressure is produced between the absorbent and the heat conducting walls of the vessel, and this pressure ensures a good transmission of heat. Before placing the apparatus into service, or already before the second enrichment is carried out, it is advisable, by heating the boiler-absorber for a long period, or by reducing the pressure, or by the application of both means at the same time, to expel the refrigerating medium from the boiler-absorber to such a degree that all the remaining air and moisture, which it is in most cases not possible to keep away during the filling, is removed. After the refrigerating medium has been reabsorbed and reboiled several times, or when the plant is in service, the initially loose powder is transformed into a solid finely-porous mass, which remains permeable to gas and is permanently in such tight contact with the walls that a good transmission of heat is ensured.

The tube 13 is designed for the accommodation of a heating unit, or for hot gases to pass through. The heat distributes itself throughout corrugated tube 12, from where it can readily spread to all parts of the absorbent. The gas expelled from the latter can pass through the openings 15 in tube 12 and bottom 14 into the cells filled with steel wool, and is conveyed upwardly in these cells and out through the connecting tube 18 to the condenser. According to requirements, the boiler-absorber may, of course, be provided with a plurality of filling openings or connecting branches. The absorbent and the steel wool may also exchange their places inside the cells. The degree to which the absorbent is enriched with the refrigerating medium before the filling, is so chosen that the saturation taking place after the filling increases the volume just sufficiently to obtain the desired pressure of the absorbent against the walls. But in any case it must be avoided that the heat-conducting walls are deformed to any great degree by an excessive increase in volume of the absorbent.

It is advisable to weigh just the amount of ground absorbent, still completely unsaturated, necessary for filling the boiler-absorber, and to place the weighed amounts in open containers into a pressure chamber, where they are enriched with the refrigerating medium. Then the contents of each container is used for filling a boiler-absorber. One is in that case sure that the boiler-absorber contains the desired amount by weight of absorbent, even if the degree of saturation and, therefore, the volume, were at the time of the filling of the vessel not exactly as prescribed.

I claim as my invention:

1. The method of charging a generator-absorber of an absorption apparatus operating with solid absorbents having the characteristic of swelling upon taking up a working medium which comprises the steps of partially enriching the solid absorbents with the working medium to swell the same to the volume necessary to completely fill the space in the absorber designed to contain the solid absorbents, then introducing the enriched material into the absorber and further enriching the material therein to the degree desired for the operation.

2. The method of charging a generator-absorber of an absorption apparatus operating with such solid absorbents having the characteristics of swelling upon taking up a working medium which comprises the steps of filling a receptacle with such an amount of absorbent as is required for charging said generator-absorber, then partially enriching said absorbent with the working medium prior to charging the generator-absorber therewith, then introducing the enriched material into the generator-absorber and finally enriching the material therein with the working medium to the degree desired for the operation.

3. The method of preparing a charge for a generator-absorber operating with a solid absorbent as claimed in claim 1, wherein the preliminary enrichment is carried out to such an extent as to result, upon introduction into the generator-absorber and further absorption, in a solid mass of gas permeable and heat conducting qualities.

4. The method of charging a generator-absorber of an absorption refrigerating apparatus operating with solid absorbents which comprises the steps of melting said absorbent, solidifying it, breaking it into pieces and granulating it, partially enriching it with refrigerant, introducing it into the generator-absorber and enriching it with the refrigerant to the degree desired for the operation.

5. The method of charging a generator-absorber of an absorption apparatus operating with such solid absorbents having the characteristics of swelling upon taking up the working medium, which comprises the steps of preparing a charge to contain such an amount of solid absorbents uniformly distributed therein that the absorbent after the enrichment with the operating medium required for the operation of the absorption apparatus fills up the entire spaces designed to take up the solid absorbent, and thereby exerts a sufficient pressure on the walls of the generator-absorber as to compress the absorbent and to thereby increase the transfer of heat, completely filling said spaces with the charge thus prepared, and then enriching the solid absorbents contained therein with the working medium to the degree required for the operation of the absorption apparatus.

6. The method of charging a generator-absorber of an absorption apparatus operating with such solid absorbents having the characteristic of swelling upon taking up the working medium consisting in subjecting the generator-absorber to a pressure test before charging said generator-absorber with a filling material, preparing said filling material to contain such an amount of solid absorbents uniformly distributed therein that the absorbent after the enrichment with the operating medium required for the operation of the absorption apparatus fills up the entire spaces designed to take up the solid absorbent thereby exerting a sufficient pressure on the walls of the generator-absorber as to compress the absorbent and to thereby increase the transfer of heat, completely filling said spaces with the charge thus prepared, and then enriching the solid absorbents contained therein with the working medium to the degree required for the operation of the absorption apparatus.

7. The method of charging a generator-absorber of an absorption apparatus operating with such solid absorbents having the characteristic of swelling upon taking up the working medium which comprises the steps of preparing a charge to contain such an amount of solid absorbents that the volume of the charge contained in the generator-absorber after driving off the operating medium during normal operation is so great as to fill up the entire spaces designed to take up the solid absorbent in said generator-absorber, completely filling said spaces with the charge prepared, and then enriching the solid absorbents contained therein with the working medium to the degree required for the operation of the absorption apparatus.

8. The method of charging a generator-absorber of an absorption apparatus operating with such solid absorbents having the characteristic of swelling upon taking up the working medium which comprises the steps of preparing a charge to contain the absorbing substance and another substance useful for the operation of the generator-absorber, said charge containing such an amount of solid absorbents uniformly distributed therein that the absorbent after the enrichment with the operating medium required for the operation of the absorption apparatus fills up the entire spaces designed to take up the solid absorbent. thereby exerting a sufficient pressure on the walls of the generator-absorber as to compress the absorbent and to thereby increase the transfer of heat, completely filling said spaces with the charge thus prepared, and then enriching the solid absorbents contained therein with the working medium to the degree required for the operation of the absorption apparatus.

9. In an absorption refrigerating apparatus operating with such solid absorbents having the characteristic of swelling upon taking up the working medium, a generator-absorber the volume of which designed to contain the filling material is smaller dimensioned than the volume which the filling material would assume if it could freely expand upon the taking up of the quantity of the working medium required for the operation, and filling material in said generator-absorber containing such absorbents.

WULFF BERZELIUS NORMELLI.